United States Patent
Caminada et al.

(10) Patent No.: US 8,714,012 B2
(45) Date of Patent: May 6, 2014

(54) MICROELECTROMECHANICAL GYROSCOPE WITH INVERSION OF ACTUATION FORCES, AND METHOD FOR ACTUATING A MICROELECTROMECHANICAL GYROSCOPE

(75) Inventors: Carlo Caminada, Rho (IT); Luciano Prandi, Bellinzago Novarese (IT); Alessandra Maria Rizzo Piazza Roncoroni, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 451 days.

(21) Appl. No.: 13/027,892

(22) Filed: Feb. 15, 2011

(65) Prior Publication Data
US 2011/0197675 A1 Aug. 18, 2011

(30) Foreign Application Priority Data
Feb. 16, 2010 (IT) .............................. 2010A 000110

(51) Int. Cl.
*G01C 19/00* (2013.01)
(52) U.S. Cl.
USPC ..................................... 73/504.12; 73/504.18
(58) Field of Classification Search
CPC ................ G01P 9/00; G01P 9/02; G01P 9/04
USPC ................. 73/504.12, 504.18, 503.3, 504.02, 73/514.32
See application file for complete search history.

(56) References Cited

U.S. PATENT DOCUMENTS

| | | | | |
|---|---|---|---|---|
| 4,977,480 A | * | 12/1990 | Nishihara | ................... 361/283.4 |
| 5,343,766 A | * | 9/1994 | Lee | ............................ 73/862.61 |
| 5,635,639 A | | 6/1997 | Greiff et al. | |
| 5,744,968 A | * | 4/1998 | Czarnocki et al. | ............ 324/608 |
| 5,850,035 A | | 12/1998 | Layton et al. | |
| 6,003,373 A | | 12/1999 | Moore et al. | |
| 6,366,099 B1 | * | 4/2002 | Reddi | ............................ 324/678 |
| 6,626,039 B1 | | 9/2003 | Adams et al. | |

(Continued)

FOREIGN PATENT DOCUMENTS

| | | |
|---|---|---|
| EP | 0132885 A1 | 2/1985 |
| EP | 1959562 A1 | 8/2008 |

OTHER PUBLICATIONS

Cha, S. et al., "A CMOS IF Variable Gain Amplifier with Exponential Gain Control," IEICE Trans. Fundamentals E88-A (2):410-415, Feb. 2005.

(Continued)

*Primary Examiner* — Peter MacChiarolo
*Assistant Examiner* — Samir M Shah
(74) *Attorney, Agent, or Firm* — Seed IP Law Group PLLC

(57) ABSTRACT

A microelectromechanical gyroscope includes a body and a driving mass, which is movable with respect to the body according to a driving axis and is capacitively coupled to the body. The gyroscope moreover includes a driving device, which forms a microelectromechanical control loop with the body and the driving mass and is configured for supplying to the driving mass driving signals having a common-mode component and respective differential components so as to maintaining the driving mass in oscillation according to the driving axis. The driving device is provided with an actuation stage configured for inverting in a controlled way the sign of the differential components of the driving signals.

22 Claims, 6 Drawing Sheets

(56) References Cited

U.S. PATENT DOCUMENTS

| | | |
|---|---|---|
| 6,661,283 B1 | 12/2003 | Lee |
| 6,672,159 B2 | 1/2004 | Schmid et al. |
| 6,675,630 B2 | 1/2004 | Challoner et al. |
| 6,720,777 B2* | 4/2004 | Wang .......................... 324/680 |
| 6,949,937 B2* | 9/2005 | Knoedgen .................... 324/658 |
| 7,168,320 B2* | 1/2007 | Murata et al. ............. 73/514.32 |
| 7,275,433 B2 | 10/2007 | Caminada et al. |
| 7,481,111 B2 | 1/2009 | Caminada et al. |
| 7,595,648 B2* | 9/2009 | Ungaretti et al. ............. 324/678 |
| 7,805,993 B2 | 10/2010 | Spahlinger |
| 7,827,864 B2* | 11/2010 | Prandi et al. ............... 73/504.18 |
| 7,898,448 B2* | 3/2011 | Murakami et al. ............ 341/143 |
| 8,051,698 B2 | 11/2011 | Prandi et al. |
| 8,061,201 B2 | 11/2011 | Ayazi et al. |
| 8,087,295 B2 | 1/2012 | Netzer |
| 8,096,179 B2 | 1/2012 | Bien et al. |
| 8,347,715 B2* | 1/2013 | Prandi ........................ 73/504.12 |
| 8,459,109 B2* | 6/2013 | Caminada et al. ......... 73/504.12 |
| 8,464,585 B2 | 6/2013 | Raman et al. |
| 2003/0025983 A1* | 2/2003 | Lasalandra et al. ........... 359/290 |
| 2006/0033588 A1 | 2/2006 | Caminada et al. |
| 2008/0190198 A1 | 8/2008 | Prandi et al. |
| 2009/0217757 A1 | 9/2009 | Nozawa |
| 2010/0132463 A1* | 6/2010 | Caminada et al. ......... 73/504.12 |
| 2010/0149721 A1* | 6/2010 | Prandi ........................... 361/277 |
| 2013/0170091 A1* | 7/2013 | Prandi ........................... 361/272 |

OTHER PUBLICATIONS

Rijns, J. J. F., "CMOS Low-Distortion High-Frequency Variable-Gain Amplifier," IEEE Journal of Solid-State Circuits 31(7):1029-1034, Jul. 1996.

Tang, Y. et al., "A Highly Linear CMOS Amplifier for Variable Gain Amplifier Applications", The 2002 45th Symposium on Circuits and Systems, vol. 1:1-109-112, Aug. 4-7, 2002.

\* cited by examiner

MICROELECTROMECHANICAL GYROSCOPE WITH INVERSION OF ACTUATION FORCES, AND METHOD FOR ACTUATING A MICROELECTROMECHANICAL GYROSCOPE

BACKGROUND

1. Technical Field

The present disclosure relates to a microelectromechanical gyroscope with inversion of actuation forces and to a method for actuating a microelectromechanical gyroscope.

2. Description of the Related Art

As is known, the use of microelectromechanical systems (MEMS) has become progressively widespread in various sectors of technology and has yielded encouraging results especially for providing inertial sensors, microintegrated gyroscopes, and electromechanical oscillators for a wide range of applications.

MEMS of this type are usually based upon microelectromechanical structures comprising at least one movable mass connected to a fixed body (stator) by springs and movable with respect to the stator according to pre-determined degrees of freedom. The movable mass is moreover coupled to the fixed body via capacitive structures (capacitors). The movement of the movable mass with respect to the fixed body, for example on account of an external stress, modifies the capacitance of the capacitors; from this it is possible to trace back to the relative displacement of the movable mass with respect to the fixed body and hence to the force applied. Vice versa, by supplying appropriate biasing voltages, it is possible to apply an electrostatic force to the movable mass to set it in motion. In addition, to provide electromechanical oscillators, the frequency response of inertial MEMS structures is exploited, which is typically of the second-order low-pass type.

Many MEMS (in particular, all electromechanical oscillators and gyroscopes) include driving devices that have the task of maintaining the movable mass in oscillation.

A first type of known solution envisages supplying, in open loop, periodic excitation at the resonance frequency of the MEMS structure. The solution is simple, but also far from effective, because the resonance frequency is not known with precision on account of the ineliminable dispersions in the processes of micromachining of semiconductors. In addition, the resonance frequency of each individual device can vary over time, for example, on account of temperature gradients or, more simply, on account of ageing.

Feedback driving circuits have then been proposed, based upon the use of sigma-delta modulators. Circuits of this type are undoubtedly more effective than the previous ones in stabilizing the oscillation of the movable mass at the real resonance frequency and in suppressing disturbance.

However, various stages are employed for filtering, decimation, and further processing of the bit flow supplied by the sigma-delta modulator. For this reason, currently available feedback driving circuits are complex to produce, cumbersome and, in practice, costly.

In addition, it should be considered that gyroscopes have a complex electromechanical structure, which comprises two masses that are movable with respect to the stator and are coupled to one another so as to present a relative degree of freedom. The two movable masses are both capacitively coupled to the stator. One of the movable masses is dedicated to driving (driving mass) and is kept in oscillation at the resonance frequency. The other movable mass (sensing mass) is driven in the oscillatory motion and, in the case of rotation of the microstructure with respect to a pre-determined axis with an angular velocity, is subject to a Coriolis force proportional to the angular velocity itself. In practice, the sensing mass operates as an accelerometer that enables sensing of the Coriolis acceleration.

For enabling actuation and providing an electromechanical oscillator in which the sensor performs the role of frequency-selective amplifier, with transfer function of a second-order low-pass type and high merit factor, the driving mass is equipped with two types of differential capacitive structures: driving electrodes and driving-detection electrodes. The driving electrodes have the purpose of sustaining self-oscillation of the movable mass in the direction of actuation, through electrostatic forces generated by the spectral component of the noise at the mechanical resonance frequency of the driving mass. The driving-detection electrodes have the purpose of measuring, through the transduced charge, the position of translation or rotation of the sensing mass in the direction of actuation.

The U.S. Pat. No. 7,305,880 describes a system for controlling the velocity of oscillation of the gyroscope, comprising a differential sense amplifier, a high-pass amplifier, and an actuation and control stage, operating in a continuous-time mode.

The U.S. Pat. No. 7,827,864 describes an improvement of the foregoing control system, in which the control loop comprises a low-pass filter in order to reduce the offset and the effects of parasitic components and couplings by operating on the overall gain and phase of the feedback loop.

In many cases, however, the desire to apply electrostatic forces of a certain intensity for maintaining the driving mass in oscillation prevents reduction of the supply voltages, in contrast with a desire that is increasingly felt in the electronics sector.

In particular, interferences may arise between first voltages, applied to obtain the electrostatic forces necessary to sustain the oscillation, and second voltages, supplied for reading the position of the driving mass.

If the supply voltage is low, the voltage variations of the driving mass can bring about a drop in the voltage on the capacitive coupling between the driving mass and the stator as far as causing inversion of the electrostatic forces. With each period, the driving action tends systematically to dampen instead of sustaining the oscillations of the driving mass, which are insufficient to produce precise readings of the rotations.

In order to make up for the deficiency of electrostatic force, prior art devices have used voltage-boosting circuits (charge pumps) for actuation of the driving mass or else increase the capacitive coupling with a larger number of electrodes. In either case, however, there are disadvantages either from the standpoint of the consumption levels (a fact that can nullify the decrease in the supply voltage) or from the standpoint of area occupation.

BRIEF SUMMARY

Some embodiments of the present disclosure provide a microelectromechanical gyroscope and a method for actuating a microelectromechanical gyroscope that will make it possible to overcome the limitations described.

According to the present disclosure a microelectromechanical gyroscope and a method for actuating a microelectromechanical gyroscope are provided as claimed, respectively, in claim 1 and claim 13.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
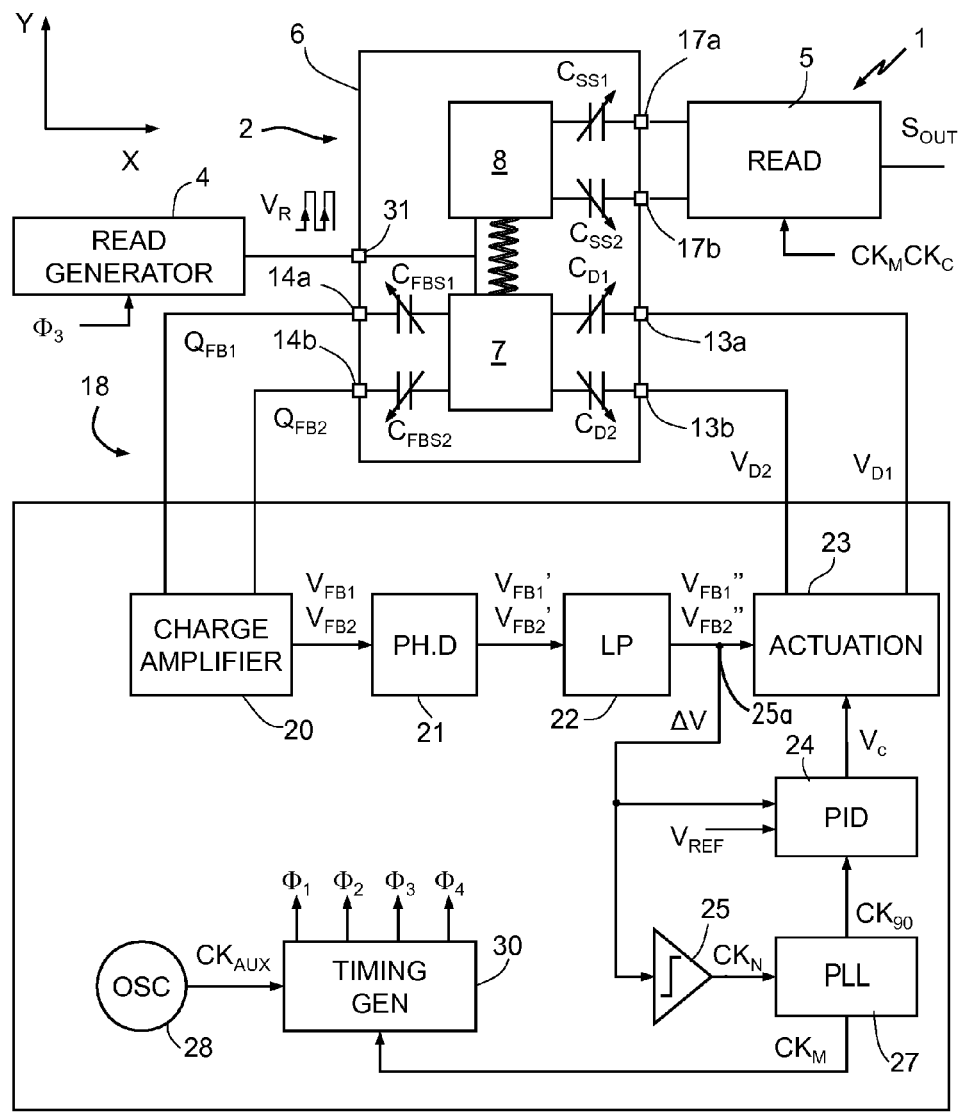
FIG. 1 is a simplified block diagram of a microelectromechanical gyroscope according to one embodiment of the present disclosure.

FIG. 1 shows as a whole a microelectromechanical gyroscope 1, which comprises a microstructure 2, made of semiconductor material, a driving device 3, a read generator 4, and a read device 5.

The microstructure 2 is made of semiconductor material and comprises a body 6, a driving mass 7, and at least one sensing mass 8. For simplicity, in the embodiment illustrated herein, reference will be made to the case of a uniaxial gyroscope, in which a single sensing mass 8 is present. What is described hereinafter applies, however, also to the case of multiaxial gyroscopes, which comprise two or more sensing masses or systems of sensing masses, for detecting rotations according to respective independent axes.

The driving mass 7 is elastically constrained to the body 6 so as to be able to oscillate about a rest position according to a translational or rotational degree of freedom. The sensing mass 8 is mechanically coupled to the driving mass 7 so as to be drawn in motion according to the degree of freedom of the driving mass 7 itself. In addition, the sensing mass 8 is elastically constrained to the driving mass 7 so as to oscillate in turn with respect to the driving mass 7 itself, with a respective further degree of freedom.

In the embodiment described herein, in particular, the driving mass 7 is linearly movable along a driving axis X, while the sensing mass 8 is movable with respect to the driving mass 7 according to a sensing axis Y perpendicular to the driving axis X.

It is understood, however, that the type of movement (translational or rotational) allowed by the degrees of freedom and the arrangement of the driving and sensing axes can vary according to the type of gyroscope. With reference to the movements of the driving mass 7 and of the sensing mass 8, moreover, the expression "according to an axis" will be indifferently used in relation to movements along an axis or about an axis, i.e., movements allowed to the masses by the respective degrees of freedom that are translational (along an axis) or else rotational (about an axis). Likewise, the expression "according to a degree of freedom" will be indifferently used in relation to translational or rotational movements, as allowed by the degree of freedom itself.

In addition, the driving mass 7 (with the sensing mass 8) is connected to the body 6 so as to define a resonant mechanical system with a resonance frequency $\omega_R$ (according to the driving axis X).

Figure 2:
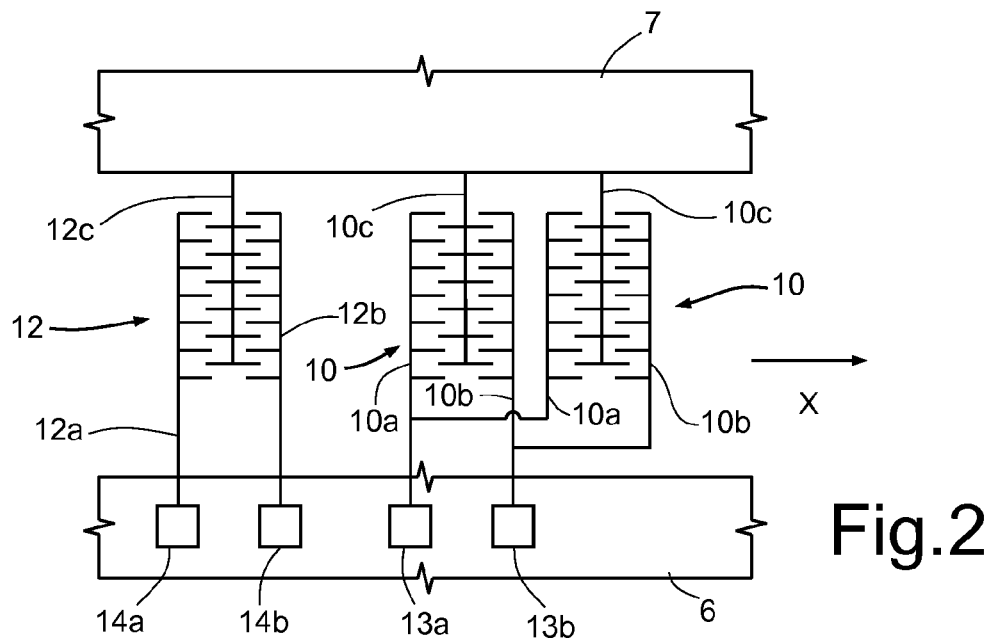
FIG. 2 is a top plan view of an enlarged detail of the gyroscope of FIG. 1.

The driving mass 7 (FIG. 2) is capacitively coupled to the body 6 through driving units 10 and feedback-sensing units 12. The capacitive coupling is of a differential type.

In greater detail, the actuation units 10 comprise first and second fixed driving electrodes 10a, 10b, which are anchored to the body 6 and extend substantially perpendicular to the driving direction X, and movable driving electrodes 10c, which are anchored to the driving mass 7 and are also substantially perpendicular to the driving direction X. The movable driving electrodes 10c are comb-fingered and capacitively coupled with respective first fixed driving electrodes 10a and second fixed driving electrodes 10b. In addition, the first and second fixed driving electrodes 10a, 10b of the actuation units 10 are electrically connected to a first driving terminal 13a and to a second driving terminal 13b, respectively, of the microstructure 2. Furthermore, as has been mentioned, the coupling is of a differential type. In other words, in each actuation unit 10 a movement of the driving mass 7 along the driving axis X determines the increase of capacitance between the movable driving electrode 10c and one of the fixed driving electrodes 10a, 10b. The capacitance between the movable driving electrode 10c and the other of the fixed driving electrodes 10a, 10b decreases instead accordingly.

The structure of the feedback-sensing units 12 is similar to that of the actuation units 10. In particular, the feedback-sensing units 12 comprise first and second fixed sensing electrodes 12a, 12b, anchored to the body 6, and movable sensing electrodes 12c, anchored to the driving mass 7 and comb-fingered and capacitively coupled with respective first fixed sensing electrodes 12a and second fixed sensing electrodes 12b. In addition, the first and second fixed sensing electrodes 12a, 12b of the feedback-sensing units 12 are electrically connected, respectively, to a first feedback-sensing terminal 14a and a second feedback-sensing terminal 14b of the microstructure 2.

Hence, in practice, the driving mass 7 is coupled to the driving terminals 13a, 13b through differential driving capacitances $C_{D1}$, $C_{D2}$ and to the sensing terminals 14a, 14b through feedback-sensing differential capacitances $C_{FBS1}$, $C_{FBS2}$.

Figure 3:
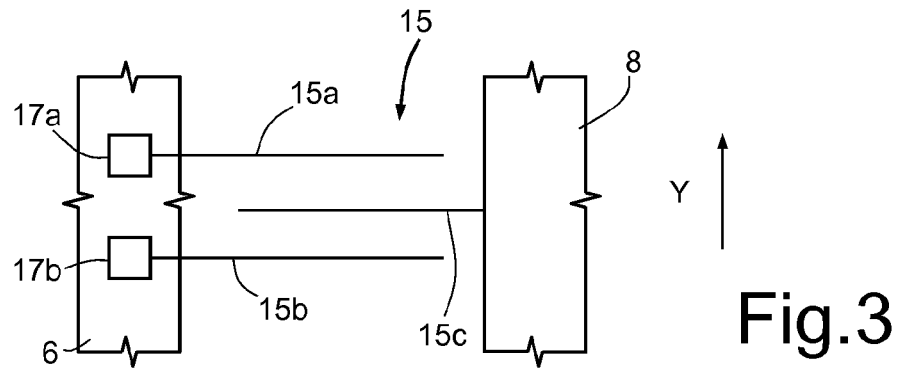
FIG. 3 is a top plan view of a further enlarged detail of the gyroscope of FIG. 1.

The sensing mass 8 is electrically connected to the driving mass 7, without interposition of insulating structures. Consequently, the sensing mass 8 and the driving mass 7 are at the same potential. The sensing mass 8 is moreover capacitively coupled to the body 6 through signal-sensing units 15 (FIG. 3). More precisely, the signal-sensing units 15 comprise third and fourth fixed sensing electrodes 15a, 15b, anchored to the body 6, and movable sensing electrodes 15c, anchored to the sensing mass 8 and arranged between respective third fixed sensing electrodes 15a and fourth fixed sensing electrodes 15b. Also in this case, the capacitive coupling is of a differential type, but is obtained through parallel-plate electrodes, perpendicular to the sensing direction Y. In addition, the third and fourth fixed sensing electrodes 15a, 15b of the signal-sensing units 15 are electrically connected, respectively, to a first signal-sensing terminal 17a and to a second signal-sensing terminal 17b of the microstructure 2. In practice, the sensing mass 8 is coupled to the signal-sensing terminals 17a, 17b through signal-sensing differential capacitances $C_{SS1}$, $C_{SS2}$.

With reference again to FIG. 1, the driving device 3 is connected to the driving terminals 13a, 13b and to the feedback-sensing terminals 14a, 14b of the microstructure 2 so as to form, with the driving mass 7, an oscillating microelectromechanical loop 18, with control of position of the driving mass 7. In greater detail, the driving device 3 comprises a charge amplifier 20, a first phase-shifter module 21, a low-pass filter 22, an actuation stage 23, a controller 24, a comparator 25, and a phase-locked-loop (PLL) circuit 27. In addition, an oscillator 28 and a timing generator 30, controlled by the PLL circuit 27, are used for supplying timing signals for the driving device 3, for the read generator 4, and for the read device 5.

The microelectromechanical loop 18 is of a hybrid type. The charge amplifier 20 is, in fact, of the switched-capacitor type and is configured to operate in discrete time, whereas the low-pass filter 22 and the actuation stage 23 operate in continuous time. The first phase-shifter module 21 carries out the time-discrete-to-time-continuous conversion.

The discrete-time part of the microelectromechanical loop 18 is cyclically actuated according to the correlated-double-sampling (CDS) technique, which comprises, for each cycle:

an equalization or reset step, in which the nodes of the circuit are set at reference voltages (normally, a common-mode voltage);

an offset-sampling step, in which possible offsets present in the components of the circuit are stored in capacitive components; and a sensing step, in which the significant signals are processed and the offsets previously stored are erased by subtraction.

In addition, the charge amplifier 20 defines a detection interface for detecting the position x of the driving mass 7 with respect to the driving axis X. The remaining components of the driving device 3 co-operate for controlling, on the basis of the position x of the driving mass 7, the amplitude of oscillation of the microelectromechanical loop 18, in particular the amplitude of oscillation of the driving mass 7, and maintain it close to a reference amplitude. The reference amplitude is in particular determined by a reference voltage $V_{REF}$, which is supplied to the controller 24.

The charge amplifier 20, which is of a fully differential type and has inputs respectively connected to the first and second feedback-sensing terminals 14a, 14b, defines a detection interface for detecting the position x of the driving mass 7 with respect to the driving axis X. The charge amplifier 20 receives differential feedback charge packets $Q_{FB1}$, $Q_{FB2}$ from the feedback-sensing terminals 14a, 14b of the microstructure 2 and converts them into feedback voltages $V_{FB1}$, $V_{FB2}$, indicating the position x of the driving mass 7. In this way, the charge amplifier 20 carries out a discrete-time reading of the position x of the driving mass 7.

The phase-shifter module 21 and the low-pass filter 22 carry out a conditioning of the feedback voltages $V_{FB1}$, $V_{FB2}$.

In greater detail, the phase-shifter module 21 is cascaded to the charge amplifier 20 and introduces a phase shift that is as close as possible to 90° and in any case comprised in the interval 90°±40°. In one embodiment, the phase-shifter module 21 comprises a sample-and-hold circuit and is moreover configured so as to carry out a first low-pass filtering. Phase-shifted feedback voltages $V_{FB1}'$, $V_{FB2}'$ supplied by the phase-shifter module 21 are thus delayed and attenuated with respect to the feedback voltages $V_{FB1}$, $V_{FB2}$. The phase-shifted feedback voltages $V_{FB1}'$, $V_{FB2}'$ present basically step-like variations.

The low-pass filter 22 is arranged downstream of the phase-shifter module 21, is a second-order fully differential filter and supplies filtered feedback voltages $V_{FB1}''$, $V_{FB2}''$ which are continuously variable in time. The cut-off frequency of the low-pass filter 22 is selected in such a way that the frequency of oscillation of the microelectromechanical loop 18 (in particular, of the driving mass 7), hereinafter referred to as driving frequency $\omega_D$, is included in the passband and in such a way that the phase of the useful signal indicating the position x of the driving mass 7 is not substantially altered. In addition, the passband of the low-pass filter 22 is such that the undesirable signal components, linked to sampling by discrete-time reading, are attenuated by at least 30 dB.

In order to prevent offsets that could jeopardize control of the oscillations of the microelectromechanical loop 18, both the phase-shifter module 21 and the low-pass filter 22 are based upon amplifiers provided with auto-zero function.

The actuation stage 23 is of a continuous-time fully differential type and has a variable gain. In addition, the actuation stage 23 is cascaded to the low-pass filter 22 and has outputs connected to the driving terminals 13a, 13b of the microstructure 2 for supplying driving voltages $V_{D1}$, $V_{D2}$ such as to sustain the oscillation of the microelectromechanical loop 18 at the driving frequency, $\omega_D$, which is close to the mechanical resonance frequency $\omega_R$ of the microstructure 2. For this purpose, the gain G of the actuation stage 23 is determined by the controller 24 through a control signal $V_C$ correlated to the filtered feedback voltages $V_{FB1}''$, $V_{FB2}''$ supplied by the low-pass filter 22. The controller 24 is, for example, a discrete-time PID controller. In particular, the gain G is determined so as to maintain the conditions of oscillation of the microelectromechanical loop 18 (unit loop gain with phase shift that is an integer multiple of 360'). For this purpose, the controller 24 receives at input the reference voltage $V_{REF}$, which indicates the desired reference amplitude of oscillation.

In addition, the actuation stage 23 is configured to invert the sign of the differential a.c. components of the driving voltages $V_{D1}$, $V_{D2}$ in each CDS cycle during the sensing step. In greater detail, the driving voltages $V_{D1}$, $V_{D2}$ are, respectively, given by $$V_{D1}=V_{CM}+K_0 \sin \omega_A t \tag{1a}$$

$$V_{D2}=V_{CM}-K_0 \sin \omega_A t \tag{1b}$$

in a first fraction of each cycle, and by $$V_{D1}=V_{CM}-K_0 \sin \omega_A t \tag{2a}$$

$$V_{D2}=V_{CM}+K_0 \sin \omega_A t \tag{2b}$$

in a second fraction of each cycle, complementary to the first fraction. In Eqs. (1a), (1b), (2a), (2b), $V_{CM}$ is a common-mode voltage of the actuation stage 23, $K_0$ is a constant, and $\omega_A$ is the current frequency of oscillation of the microelectromechanical loop 18 (equal to the driving frequency $\omega_D$ in steady-state conditions). The differential components of the driving voltages $V_{D1}$, $V_{D2}$ are defined by the terms $K_0 \sin \omega_A t$. The second fraction of the cycle starts simultaneously with the sensing step and terminates in slight advance.

The comparator 25 has inputs connected to the inputs of the actuation stage 23, which define control nodes 25a, and receives the difference voltage ΔV between the filtered feedback voltages $V_{FB1}''$, $V_{FB2}''$ at output from the low-pass filter 22. The comparator 25 switches at each zero crossing of the difference voltage ΔV, thus operating as a frequency-detector device. In one embodiment, the comparator 25 is connected to a single control node and switches at each zero crossing of one of the filtered feedback voltages $V_{FB1}''$, $V_{FB2}''$ (the zero crossings of the filtered feedback voltages $V_{FB1}''$, $V_{FB2}''$ and of the difference voltage ΔV coincide).

The output of the comparator 25, which supplies a native clock signal $CK_N$, is connected to an input of the PLL circuit 27 so as to enable phase locking with the microelectromechanical loop 18. The native clock signal $CK_N$ is, however, phase-shifted with respect to the driving mass, on account of the presence of the charge amplifier 20, the first phase-shifter module 21, and the low-pass filter 22.

The PLL circuit 27 supplies a master clock signal $CK_M$ and a quadrature clock signal $CK_{90}$. The master clock signal $CK_M$ has a frequency equal to an integer multiple of the frequency of the native clock signal $CK_N$. If we designate by $\omega_M$ the frequency of the master clock signal $CK_M$, and by $\omega_M$ the frequency of the native clock signal $CK_N$, we hence have $$\omega_M = K\omega_N$$

for example with $K=2^{10}$.

The quadrature clock signal $CK_{90}$ has the same frequency and is phase-shifted by 90° with respect to the native clock signal $CK_N$ and is used for timing the controller 24. In practice, the quadrature clock signal $CK_{90}$ switches at the maxima and at the minima of the filtered feedback voltages $V_{FB1}''$, $V_{FB2}''$ at output from the low-pass filter 22.

The controller 24 is thus properly timed so as to detect the peak values of the difference voltage ΔV between the filtered feedback voltages $V_{FB1}''$, $V_{FB2}''$.

The oscillator 28 provides the timing generator 30 with an auxiliary clock signal $CK_{AUX}$ having a calibrated frequency, close to the master frequency $\omega_M$.

The timing generator 30 receives the master clock signal $CK_M$ and the auxiliary clock signal $CK_{AUX}$ and uses them for generating the timing signals necessary for the discrete-time components and, more in general, for proper operation of the gyroscope 1. The auxiliary clock signal is used when the PLL circuit 27 is not synchronized with the oscillations of the microelectromechanical loop 18 and thus the master clock signal $CK_M$ is not available, as, for example, during steps of start-up or reset following upon impact. The master clock signal $CK_M$ is used when the oscillations of the microelectromechanical loop 18 are stabilized at the driving frequency $\omega_D$.

In detail, the timing generator 30 supplies a first timing signal $\Phi_1$, a second timing signal $\Phi_2$, a third timing signal $\Phi_3$, and a fourth timing signal $\Phi_4$, which, in steady-state conditions, have a frequency equal to an integer multiple of the frequency of the native clock signal $CK_N$ (for example, 40 $\omega_D$). The first, second and third timing signals $\Phi_1$, $\Phi_2$, $\Phi_3$ define the reset step, the offset-sampling step, and the sensing step for actuation in accordance with the CDS technique. The third timing signal $\Phi_3$ is used also to drive the read generator 4 so as to provide the driving mass 7 and the sensing mass 8 with a square-wave read signal $V_R$ of a duration equal to the duration of the sensing step. In one embodiment, the read signal $V_R$ is a voltage that varies between 0 V and $2V_{CM}$, where $V_{CM}$ is a common-mode voltage for the components of the microelectromechanical loop 18. The fourth timing signal $\Phi_4$ drives the inversion of sign of the differential components of the driving voltages $V_{D1}$, $V_{D2}$.

Figure 4:
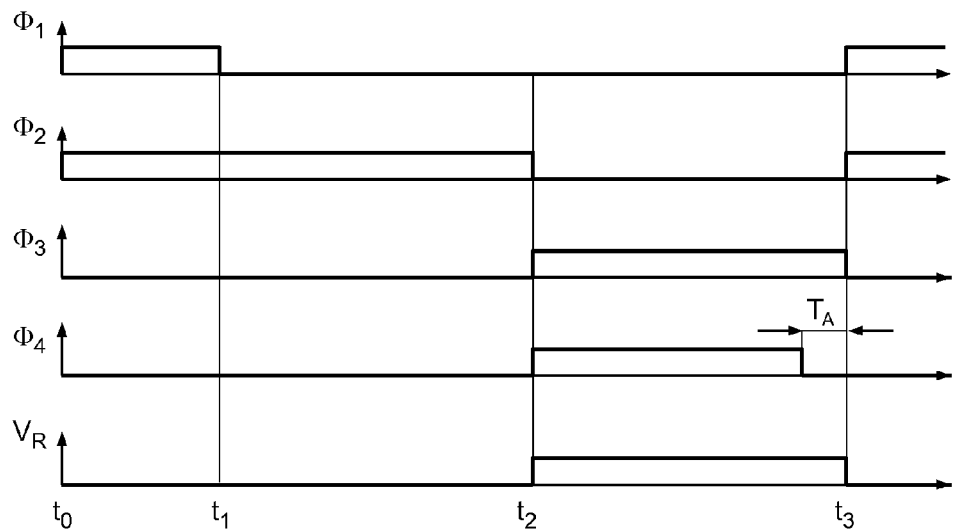
FIG. 4 is a graph regarding signals used in the gyroscope of FIG. 1.

The temporal correlation between the read signal $V_R$ and the timing signals $\Phi_1$, $\Phi_2$, $\Phi_3$, $\Phi_4$ is illustrated in FIG. 4 and is defined to implement sensing and control cycles according to the CDS technique. The first and second timing signals $\Phi_1$, $\Phi_2$ are high in a first fraction ($t_0$-$t_1$) of each cycle (approximately one fifth of the period, reset step), whilst the third timing signal $\Phi_3$ and the fourth timing signal $\Phi_4$ are low. Then (instant $t_1$), the first timing signal $\Phi_1$ switches, and the situation remains unvaried for a second fraction ($t_1$-$t_2$) of the period (approximately two fifths, offset-sampling step; by "offset" is meant here and in what follows both the static offset and the contributions of flicker noise associated to the various components). At an instant $t_2$, the second timing signal $\Phi_2$ switches and remains stable during the third and last fraction ($t_2$-$t_3$) of the period (again two fifths, sensing step). At the instant $t_2$ also the third timing signal $\Phi_3$ and the fourth timing signal $\Phi_4$, which have first edges (in this case, leading edges) concomitant, switch. However, while the third timing signal $\Phi_3$ remains stable throughout the sensing step, up to the instant $t_3$, the fourth timing signal $\Phi_4$ switches slightly in advance. In practice, the fourth timing signal $\Phi_4$ has a second edge (in this case the trailing edge) in advance with respect to the third timing signal $\Phi_3$. As will be explained hereinafter, this solution has the purpose of compensating spurious charge injections due to the switching of the driving voltages $V_{D1}$, $V_{D2}$ and to the presence of parasitic capacitive couplings between the driving terminals 13a, 13b and the signal-sensing terminals 17a, 17b.

In a start-up step of the gyroscope 1, however, the basis for the generation of the timing signals $\Phi_1$, $\Phi_2$, $\Phi_3$, $\Phi_4$ (and hence of the read signal $V_R$) is a high-frequency asynchronous clock signal $CK_{AS}$ produced by the oscillator 28.

The read device 5 is of the discrete-time open-loop type and, in the embodiment described herein, is configured to execute a so-called "double-ended" reading of the displacements of the sensing mass 8 according to the respective degree of freedom (in particular, for detecting a position y of the sensing mass along the sensing axis Y). In particular, the read device 5 has inputs connected to the signal-sensing terminals 17a, 17b of the microstructure 2 and an output 5a, which supplies an output signal $S_{OUT}$, indicating the angular velocity W of the microstructure 2.

Figure 5A:
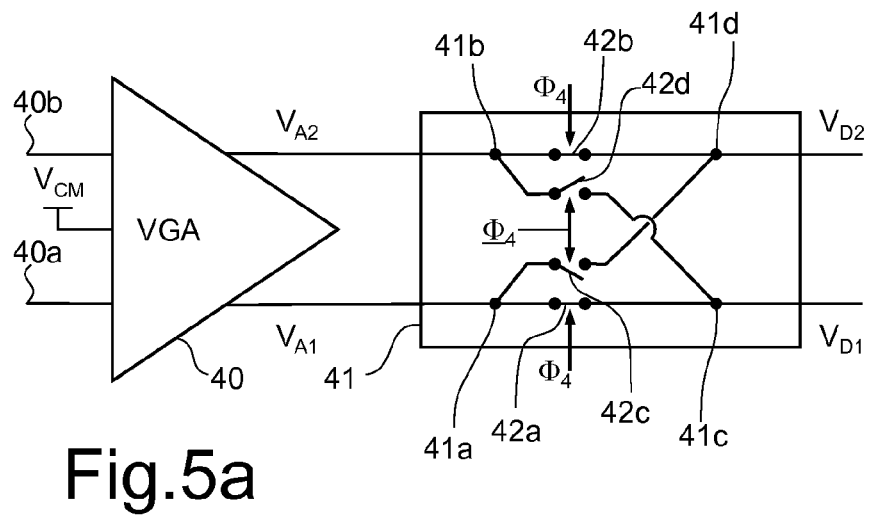
FIGS. 5a and 5b show simplified circuit diagrams of a first component of the gyroscope of FIG. 1, in a first operating configuration and in a second operating configuration, respectively.
Figure 5B:
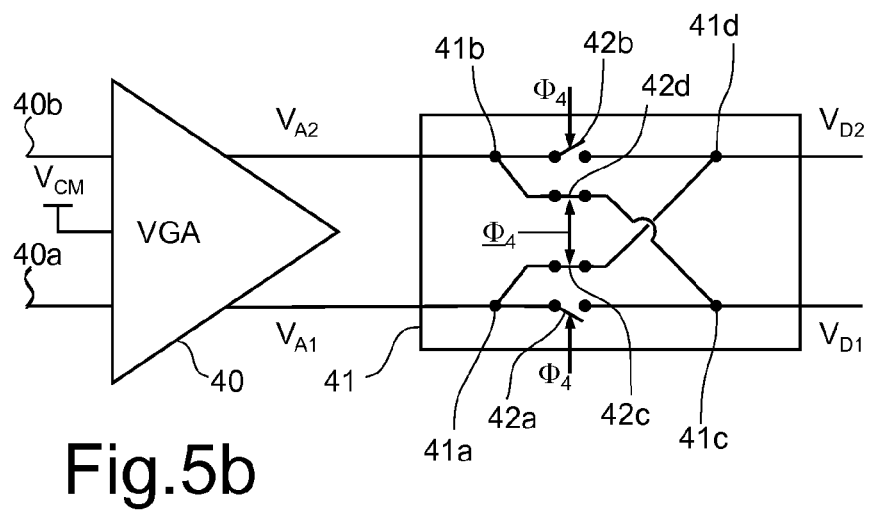

FIGS. 5a, 5b illustrate in greater detail the actuation stage 23, which comprises a fully differential variable-gain amplifier (VGA) 40 and a switching module 41.

The variable-gain amplifier 40 has signal inputs 40a, 40b, connected to the low-pass filter 22 for receiving the filtered feedback voltages $V_{FB1}''$, $V_{FB2}''$, and a gain-control input 40c, connected to the controller 24 for receiving the control signal $V_C$. The outputs of the variable-gain amplifier 40 supply amplified voltages $V_{A1}$, $V_{A2}$, the difference of which is proportional, according to the gain determined by the control signal $V_C$, to the difference between the filtered feedback voltages $V_{FB1}''$, $V_{FB2}''$. In addition, the amplified voltages $V_{A1}$, $V_{A2}$ are symmetrical with respect to the common-mode voltage $V_{CM}$ of the actuation stage 23.

The switching module 41 has a first input 41a and a second input 41b, which are connected to respective outputs of the variable-gain amplifier 40, and a first output 41c and a second output 41d, which are, respectively, connected to the first driving terminal 13a and to the second driving terminal 13b of the microstructure 2. A first direct-connection switch 42a and a second direct-connection switch 42b are connected between the first input 41a and the first output 41c and, respectively, between the second input 41b and the second output 41d and are controlled by the fourth timing signal $\Phi_4$; a first cross-connection switch 42c and a second cross-connection switch 42d are connected between the first input 41a and the second output 41d and, respectively, between the second input 41b and the first output 41c and are controlled by the negated fourth timing signal $\underline{\Phi}_4$. In particular, the direct-connection switches 42a, 42b and the cross-connection switches 42c, 42d are controlled in such a way that the connection between the inputs 41a, 41b and the outputs 41c, 41d of the switching module 41 is inverted, with respect to the amplified voltages $V_{A1}$, $V_{A2}$, during the sensing step, up to switching of the negated fourth timing signal $\Phi_4$ (which, as has been mentioned, occurs in advance with respect to the end of the sensing step, defined by the switching of the third timing signal $\Phi_3$).

Figure 6:
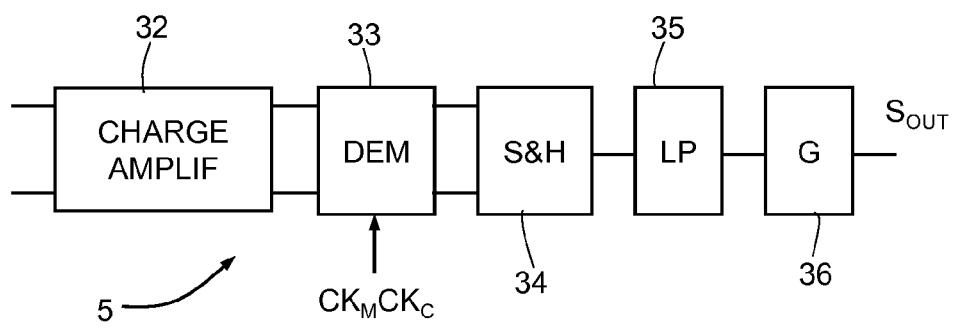
FIG. 6 is a more detailed block diagram of a second component of the gyroscope of FIG. 1.

As shown in FIG. 6, in one embodiment the read device 5 comprises a charge amplifier 32, a demodulator 33, which receives the master clock signal $CK_M$ and the base clock signal $CK_B$, a sample-and-hold (S&H) stage 34, a low-pass filter 35, and an output amplifier 36, which are cascaded to one another. The charge amplifier 32 and the demodulator 33 are of the switched-capacitor fully differential type.

The gyroscope 1 operates as hereinafter described. The driving mass 7 is set in oscillation along the driving axis X by the driving device 3 with the driving frequency $\omega_D$ in steady-state conditions.

The sensing mass 8 is drawn in motion along the driving axis X by the driving mass 7. Consequently, when the microstructure 2 rotates about a gyroscopic axis perpendicular to the plane of the axes X, Y at a certain instantaneous angular velocity $\Omega$, the sensing mass 8 is subject to a Coriolis force, which is parallel to the sensing axis Y and is proportional to the angular velocity $\Omega$, of the microstructure 2 and to the velocity of the two masses 7, 8 along the driving axis X. More precisely, the Coriolis force ($F_C$) is given by the following equation:

$$F_C = 2M_S \Omega x''$$

where $M_S$ is the value of the sensing mass 8, $\Omega$ is the angular velocity of the microstructure 2, and x' is the velocity of the two masses 7, 8 along the driving axis X. In steady-state conditions, the velocity x' varies sinusoidally at the driving frequency $\omega_D$, with a phase shift of 90° with respect to the position x according to the driving axis X. The displacements of the sensing mass 8 caused by the Coriolis force are read by applying the read signal $V_R$ to the sensing mass 8 itself and by converting differential charge packets thus produced into the output signal $S_{OUT}$, by the read device 5.

The controller 24, the comparator 25, and the PLL circuit 27 co-operate with the phase-shifter module 21, the low-pass filter 22, and the actuation stage 23 to create and maintain the conditions of oscillation of the microelectromechanical loop 18 in different operating steps of the gyroscope 1.

In particular, the actuation stage 23 applies to the driving mass 7 electrostatic forces such as to favor at each instant the oscillations thereof, in particular during the sensing steps of each CDS actuation cycle, substantially preventing transmission damping forces.

Figure 7:
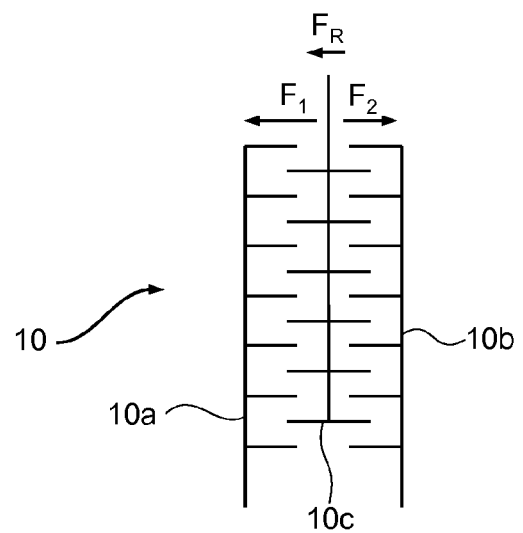
FIG. 7 is a further enlarged detail of a part of FIG. 2.

The resultant force $F_R$ on each movable driving electrode 10c is determined by two opposite forces $F_1$, $F_2$, due to the electrostatic attraction between the movable driving electrode 10c and the corresponding first and second fixed driving electrodes 10a, 10b (see in this connection FIG. 7). The forces $F_1$, $F_2$ depend upon actuation voltages $V_{A1}$, $V_{A2}$ between the movable driving electrode 10c and the respective fixed driving electrode 10a, 10b according to the law:

$$F_1 = K_1 V_{A1}^2$$

$$F_2 = -K_1 V_{A2}^2$$

where $K_1$ is a constant that depends upon the characteristics of the microstructure 2.

We thus have $$F_R = B(V_{A1}^2 - V_{A2}^2)$$

In turn, the actuation voltages $V_{A1}$, $V_{A2}$ are given by $$V_{A1} = V_{D1} - V_R = (V_{CM} + K_0 \sin \omega_A t) - V_R$$

$$V_{A2} = V_{D2} - V_R = (V_{CM} - K_0 \sin \omega_A t) - V_R$$

Since the read voltage $V_R$ is zero in the steps of reset and offset sampling, in these steps the resultant force $F_R$ applied to each movable driving electrode 10c is equal to $$F_R = B(V_{A1}^2 - V_{A2}^2) = 4K_0 K_1 V_{CM} \sin \omega_A t$$

During the sensing step, instead, the read voltage $V_R$ has a value other than zero and greater than the common-mode voltage (the tendency is, in fact, to exploit all the dynamics available in order to maximize the amplitude of the output signal). We thus have $$F_R = -4K_0 K_1 (V_{CM} - V_R) \sin \omega_A t$$

The minus sign is due to the action of the switching module 41 during the sensing step of each CDS actuation cycle. Given that the read voltage $V_R$ is greater than the common-mode voltage $V_{CM}$, the term ($V_{CM} - V_R$) is negative. Even though, during the sensing step, the resultant force $F_R$ is smaller in module than in the steps of reset and offset sampling, its orientation remains the same and does not hinder actuation of the driving mass 7. The damping action during the sensing step is eliminated and hence, given the same driving voltages applied and the same available surface of the electrodes, the oscillations of the driving mass 7 are larger. Consequently, also the output signal $S_{OUT}$ supplied by the read device 5 is less subject to disturbance and has a better signal-to-noise ratio.

Figure 8A:
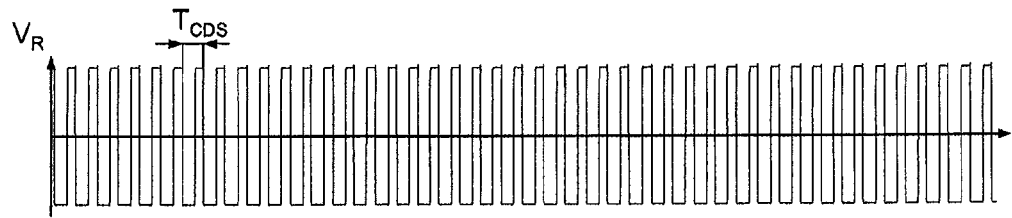
FIGS. 8a-8e are graphs regarding signals used in the gyroscope of FIG. 1.
Figure 8B:
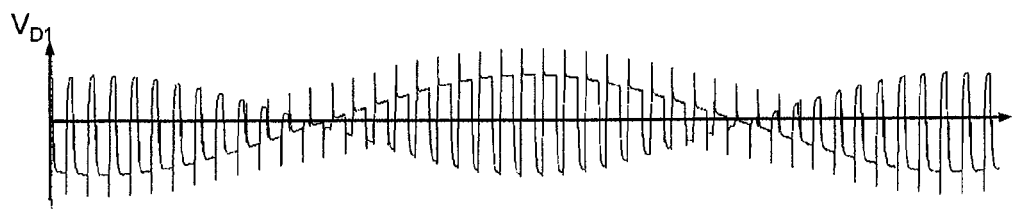
Figure 8C:
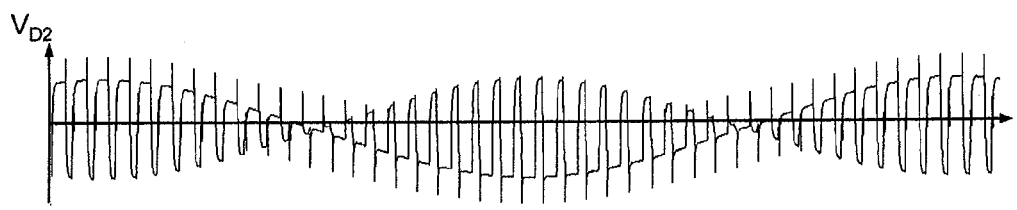
Figure 8D:
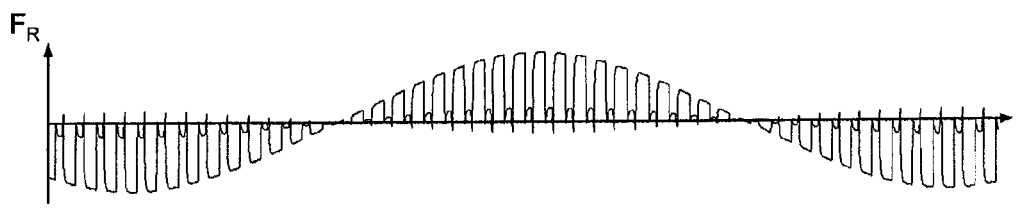
Figure 8E:
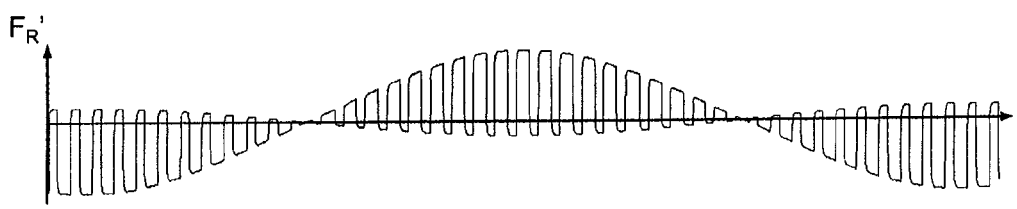

By way of example, FIGS. 8a-8d show, respectively, the read voltage $V_R$, the driving voltage $V_{D1}$, the driving voltage $V_{D2}$, and the resultant force $F_R$ as a consequence of the inversion of sign of the differential components of the driving voltages $V_{D1}$, $V_{D2}$ during the reset step. FIG. 8e shows, instead, the resultant force $F_R'$ that would be obtained in the absence of inversion of polarity. As may be noted, the inversion of polarity ensures that the resultant force $F_R$ will remain oriented in the same direction during each actuation period $T_{CDS}$ in accordance with the CDS technique.

Figure 9A:
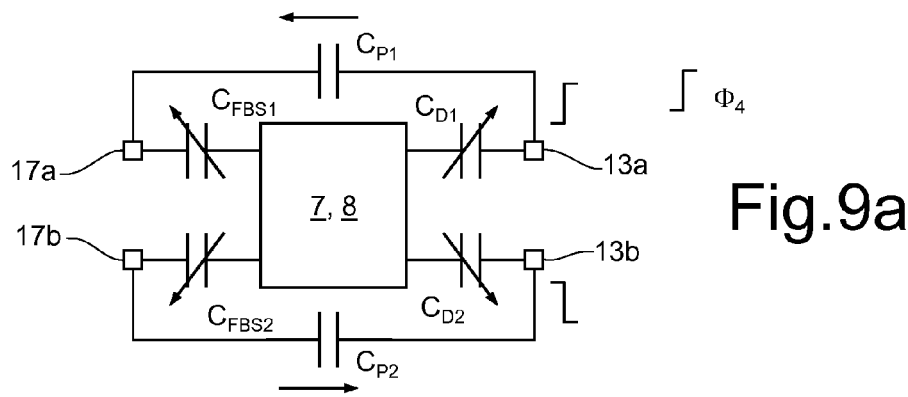
FIGS. 9a-9b are schematic depictions of a mass and parasitic capacitances of the gyroscope of FIG. 1.
Figure 9B:
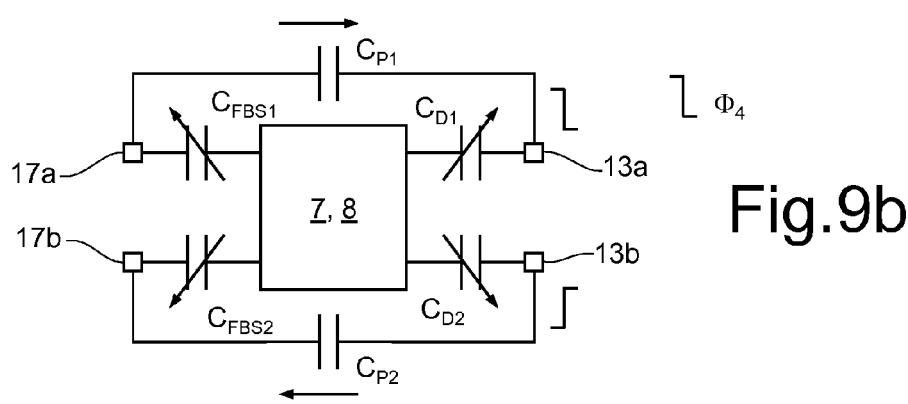

As mentioned previously with reference to FIG. 4, the fourth timing signal $\Phi_4$, which controls the switching module 41 and determines the sign inversion of the differential components of the driving voltages $V_{D1}$, $V_{D2}$, switches at the start of the sensing step (instant $t_2$) of each CDS actuation cycle and with an advance $T_A$ with respect to the start of the next reset step. In this way, any disturbance due to direct injection of charge at the signal-sensing terminals 17a, 17b as a result of parasitic capacitive couplings with the driving terminals 13a, 13b is avoided (see in this connection the parasitic capacitances $C_{P1}$, $C_{P2}$ in FIGS. 9a and 9b, where the driving mass 7 and the sensing mass 8, which are without mutual insulation, are represented in a simplified way as a single body).

At the start of the sensing step, the switching module 41 determines the sign inversion of the differential components of the driving voltages $V_{D1}$, $V_{D2}$ (FIGS. 4, 5a and 5b), which is equivalent to applying voltage steps to the driving terminals 13a, 13b. On account of the parasitic capacitances $C_{P1}$, $C_{P2}$, the variation of the driving voltages $V_{D1}$, $V_{D2}$ produces a first transfer of charge to the signal-sensing terminals 17a, 17b, which is detectable by the read device 5. Thanks to the advance $T_A$, the switching module 41 reverses again the sign of the differential components of the driving voltages $V_{D1}$, $V_{D2}$ before completion of the sensing step and causes a second, opposite, transfer of charge, which substantially compensates for the effect of the first transfer of charge. Preferably, the advance $T_A$ is sufficient to complete the second transfer of charge before start of the reset step of the next CDS actuation cycle. In this way, the effect of the inversions caused by the switching module 41 is masked, because the transfers of charge cancel out during the same sensing step. The final values "frozen" at the end of the sensing step and transduced by the read device 5 are hence immune from the disturbance that the inversions of sign of the differential components of the driving voltages $V_{D1}$, $V_{D2}$ can produce through the parasitic capacitances $C_{P1}$, $C_{P2}$.

In one embodiment, the advance $T_A$ is programmable (for example, it is stored in a register, here not shown).

Figure 10:
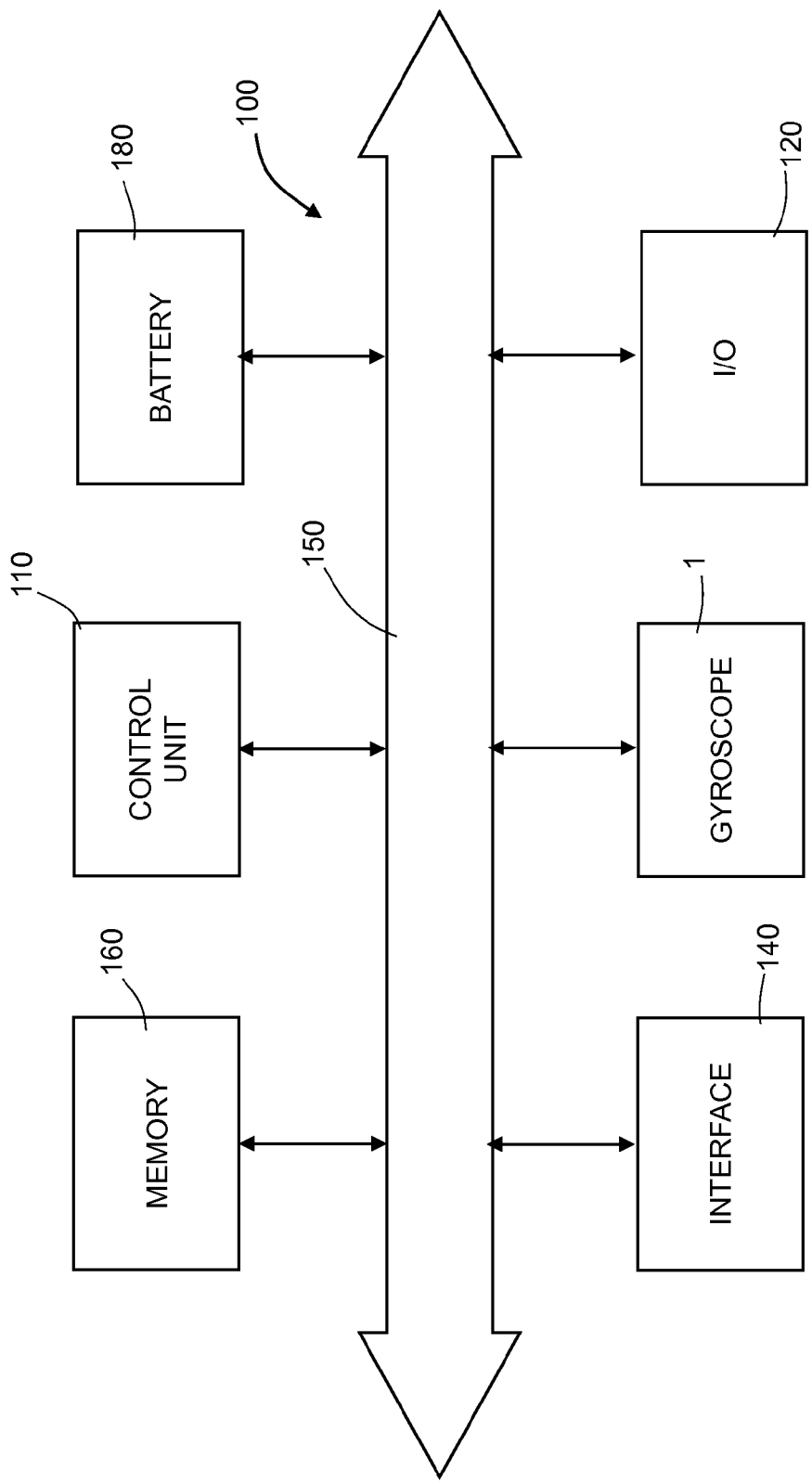
FIG. 10 is a simplified block diagram of an electronic system incorporating a microelectromechanical gyroscope according to one embodiment of the present disclosure.

FIG. 10 illustrates a portion of an electronic system 100 according to one embodiment of the present disclosure. The system 100 incorporates the gyroscope 1 and may be used in devices as, for example, a palmtop computer (personal digital assistant, PDA), a laptop or portable computer, possibly with wireless capacity, a cell phone, a messaging device, a digital music reader, a digital camera or other devices designed to process, store, transmit or receive information. For example, the gyroscope 1 may be used in a digital camera for detecting movements and carrying out an image stabilization. In other embodiments, the gyroscope 1 is included in a portable computer, a PDA, or a cell phone for detecting a free-fall condition and activating a safety configuration. In a further embodiment, the gyroscope 1 is included in a user interface activated by movement for computers or consoles for videogames. In a further embodiment, the gyroscope 1 is incorporated in a satellite-navigation device and is used for temporary tracking of position in the case of loss of the satellite-positioning signal.

The electronic system 100 may comprise a controller 110, an input/output (I/O) device 120 (for example a keyboard or a screen), the gyroscope 1, a wireless interface 140, and a memory 160, of a volatile or nonvolatile type, coupled to one another through a bus 150. In one embodiment, a battery 180 may be used for supplying the system 100. It is to be noted that the scope of the present disclosure is not limited to embodiments having necessarily one or all of the devices listed.

The controller 110 may comprise, for example, one or more microprocessors, microcontrollers, and the like.

The I/O device 120 may be used for generating a message. The system 100 may use the wireless interface 140 for transmitting and receiving messages to and from a wireless-communications network with a radiofrequency (RF) signal. Examples of wireless interface may comprise an antenna, a wireless transceiver, such as a dipole antenna, even though the scope of the present disclosure is not limited from this standpoint. In addition, the I/O device 120 may supply a voltage representing what is stored either in the form digital output (if digital information has been stored) or in the form analog output (if analog information has been stored).

Finally, it is clear that modifications and variations may be made to the gyroscope and to the method described, without thereby departing from the scope of the present disclosure.

In particular, the gyroscope could have any different micromechanical structure. For example, the disclosure may be advantageously exploited in: gyroscopes with one or more sensing masses linearly movable with respect to the driving mass and sensitive to pitch and/or roll rotations (in addition to yaw rotations); gyroscopes with cantilever sensing masses or sensing masses in the form of beams oscillating about centroidal or non-centroidal axes; and uniaxial and multiaxial gyroscopes with angularly oscillating driving mass.

In addition, it is clearly possible to use a different number of timing signals, with different phase relationships, in order to carry out driving of the microelectromechanical loop (in particular, for implementing the CDS function), as required by the structure of the individual components.

In this connection, it is possible to generate the timing signals using a master clock signal supplied by an asynchronous oscillator calibrated at the driving frequency. The PLL circuit can thus be eliminated, with considerable saving in terms of area occupation and of additional components external to the chip.

The various embodiments described above can be combined to provide further embodiments. All of the U.S. patents, U.S. patent application publications, U.S. patent application, foreign patents, foreign patent application and non-patent publications referred to in this specification are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microelectromechanical gyroscope comprising:
a body;
a driving mass configured to move with respect to the body with a first degree of freedom according to a driving axis;
a capacitive coupling that couples the driving mass to the body; and
a driving device configured to form a microelectromechanical control loop with the body and the driving mass and configured to provide the driving mass with driving signals having a common-mode component and respective differential components so as to maintain the driving mass in oscillation according to the driving axis with a driving frequency, the driving device including an actuation stage configured to selectively invert a sign of the differential components of the driving signals.

2. The gyroscope according to claim 1, comprising:
a sensing mass mechanically coupled to the driving mass so as to be drawn in motion according to the driving axis and movable with respect to the driving mass with a second degree of freedom according to a sensing axis, in response to rotations of the body;
a read generator configured to provide the sensing mass with a square-wave read signal; and
a read device configured to provide output signals indicative of a position of the sensing mass in response to the read signal;
wherein the actuation stage is configured to invert the sign of the differential components of the driving signals in concurrence with first edges of the read signal.

3. The gyroscope according to claim 2, wherein the actuation stage is configured to invert the sign of the differential components of the driving signals with an advance with respect to second edges of the read signal, consecutive to the first edges.

4. The gyroscope according to claim 3, wherein the advance is programmable.

5. The gyroscope according to claim 2, wherein the actuation stage comprises:
an amplifier having a first amplifier output and a second amplifier output; and
a switching module having a first input and a second input, coupled respectively to the first amplifier output and the second amplifier output, and a first switching output and a second switching output coupled to the driving mass through respective driving terminals and the capacitive coupling, wherein the switching module is configured, in a first operating configuration, to couple the first input to the first switching output and couple the second input to the second switching output and, in a second operating configuration, to couple the first input to the second switching output and couple the second input to the first switching output.

6. The gyroscope according to claim 5, comprising a timing generator configured to control the read generator and the read device through a set of timing signals and switch the switching module between the first operating configuration and the second operating configuration through a further timing signal.

7. The gyroscope according to claim 6, wherein the timing generator is configured to switch the switching module from the first operating configuration to the second operating configuration in concurrence with the first edges of the read signal.

8. The gyroscope according to claim 6, wherein the actuation stage is configured to invert the sign of the differential components of the driving signals with an advance with respect to second edges of the read signal, consecutive to the first edges, and the timing generator is configured to switch the switching module from the second operating configuration to the first operating configuration with the advance with respect to the second edges of the read signal.

9. The gyroscope according to claim 5, wherein the amplifier is a variable-gain amplifier.

10. The gyroscope according to claim 1, wherein the driving device comprises a detection interface capacitively coupled to the driving mass and configured to provide feedback signals indicative of a position of the driving mass with respect to the driving axis.

11. The gyroscope according to claim 10, wherein the actuation stage is coupled to the detection interface and is configured to generate the driving signals based on the feedback signals.

12. The gyroscope of claim 1 wherein the driving device is configured to detect feedback signals from the driving mass and generate the driving signals based on the feedback signals.

13. A system comprising:
a control unit; and
a microelectromechanical gyroscope coupled to the control unit, the gyroscope including:
a substrate;
a driving mass configured to receive driving signals, to output feedback signals, and to move with respect to the substrate with a first degree of freedom along a driving axis;
a driving device configured to generate the driving signals based on the feedback signals, the driving signals having a common-mode component and differential components that maintain the driving mass in oscillation according to the driving axis with a driving frequency, the driving device including:
an actuation stage configured to selectively invert a sign of the differential components of the driving signals.

14. The system according to claim 13, wherein the gyroscope includes:
a sensing mass mechanically coupled to the driving mass so as to be drawn in motion according to the driving axis and movable with respect to the driving mass with a second degree of freedom along a sensing axis, in response to rotations of the substrate;
a read generator configured to provide the sensing mass with a square-wave read signal; and
a read device configured to provide output signals indicative of a position of the sensing mass in response to the read signal;
wherein the actuation stage is configured to invert the sign of the differential components of the driving signals in concurrence with first edges of the read signal.

15. The system according to claim 13, wherein the actuation stage comprises:
an amplifier having a first amplifier output and a second amplifier output; and
a switching module having a first input and a second input, coupled respectively to the first amplifier output and second amplifier output, and a first switching output and a second switching output coupled to the driving mass through respective driving terminals, the switching module being configured, in a first operating configuration, to couple the first input to the first switching output and couple the second input to the second switching output and, in a second operating configuration, to couple the first input to the second switching output and couple the second input to the first switching output.

16. The system according to claim 15, wherein the gyroscope includes:
a sensing mass mechanically coupled to the driving mass so as to be drawn in motion along the driving axis and movable with respect to the driving mass with a second degree of freedom according to a sensing axis, in response to rotations of the substrate;
a read generator configured to provide the sensing mass with a square-wave read signal;
a read device configured to provide output signals indicative of a position of the sensing mass in response to the read signal, wherein the actuation stage is configured to invert the sign of the differential components of the driving signals in concurrence with first edges of the read signal; and
a timing generator configured to control the read generator and the read device through a set of timing signals and switch the switching module between the first operating configuration and the second operating configuration through a further timing signal.

17. The system according to claim 16, wherein the timing generator is configured to switch the switching module from the first operating configuration to the second operating configuration in concurrence with the first edges of the read signal.

18. The system according to claim 16, wherein the actuation stage is configured to invert the sign of the differential components of the driving signals with an advance with respect to second edges of the read signal, consecutive to the first edges, and the timing generator is configured to switch the switching module from the second operating configuration to the first operating configuration with the advance with respect to the second edges of the read signal.

19. A method, comprising:

actuating a microelectromechanical gyroscope that includes a substrate, a driving mass configured to move with respect to the substrate with a first degree of freedom according to a driving axis, and a driving device configured to form a microelectromechanical control loop with the substrate and the driving mass, the actuating including:

maintaining the driving mass in oscillation according to the driving axis with a driving frequency by providing the driving mass with the driving signals from the driving device, the driving signals having a common-mode component and respective differential components; and selectively inverting the sign of the differential components of the driving signals with an actuation stage in the driving device.

20. The method according to claim 19, further comprising:

generating square-wave read signal in a read generator;

providing a sensing mass with the square-wave read signal, the sensing mass being mechanically coupled to the driving mass so as to be drawn in motion according to the driving axis and movable with respect to the driving mass with a second degree of freedom according to a sensing axis, in response to rotations of the substrate; and detecting a position of the sensing mass in response to the read signal;

wherein selectively inverting the sign of the differential components of the driving signals includes inverting the sign of the differential components of the driving signals in concurrence with first edges of the read signal.

21. The method according to claim 19, wherein selectively inverting the sign of the differential components of the driving signals comprises inverting the sign of the differential components of the driving signals with an advance with respect to second edges of the read signal, consecutive to the first edges.

22. The method of claim 19 wherein maintaining the driving mass in oscillation includes:

detecting feedback signals from the driving mass; and generating the driving signals in the driving device based on the feedback signals.

\* \* \* \* \*